Patented Dec. 19, 1944

2,365,466

UNITED STATES PATENT OFFICE 2,365,466

ORGANIC COMPOUNDS

Lyle Armstrong Hamilton, Pitman, N. J., assignor to E. I. du Pont de Nemours & Company, Wilmington, Del., a corporation of Delaware No Drawing. Application October 23, 1942, Serial No. 463,079

2 Claims. (Cl. 260—543)

This invention relates to the preparation of unsaturated organic compounds of phosphorus.

The invention has as an object the provision of a process for the preparation of organic phosphonic acid dichlorides having the phosphondichloride group attached to an ethylenically unsaturated hydrocarbon radical. A further object is a process for the preparation of the corresponding acids, diesters and diamides. Another object comprises a new class of compounds — the alpha,beta-ethylenically unsaturated hydrocarbon phosphonic acid dichlorides. Other objects will appear hereinafter.

These objects are accomplished by the following invention wherein an aliphatic compound having a hydroxyl group and a phosphonic acid (—PO₃H₂)

group attached to the same carbon, in a hydrocarbon radical, which carbon is attached to a second carbon carrying a hydrogen atom, is heated at 125°–250° C. with evolution of water from the compound to form an alpha,beta-ethylenically unsaturated hydrocarbon phosphonic acid. This is desirably purified by conversion to the phosphonic acid dichloride and reconversion to the acid by hydrolysis. The phosphonic acid dichlorides can also be converted to the diesters by reaction with alcohols and phenols or to the diamides by reaction with ammonia or amines having hydrogen on amino nitrogen.

In general, the preferred mode of operation of this invention is as follows: An alpha-hydroxyalkylphosphonic acid having at least one hydrogen atom on one of the beta carbon atoms and having two alkyl groups on the (acyclic) alpha carbon is dehydrated by heating at a temperature of 125–250° C. The lower members are best dehydrated by passing the molten acid over heated fused silica or silica gel. The product obtained, an alkene phosphonic acid, having the phosphono group on one of the doubly bonded carbons is dried by topping, i. e., heating with removal of volatiles to 100–150° C. under a pressure of 5–20 mm. and is then converted to the corresponding alkene phosphonic acid dichloride by adding portionwise, under essentially anhydrous conditions and with cooling in the initial stages, 2–2.5 moles of phosphorus pentachloride per mole of phosphonic acid. The lower membered acid chlorides, i. e., those containing up to seven carbon atoms are obtained in a high state of purity by fractional distillation under reduced pressure. For the higher homologs, i. e., compounds containing at least eight carbon atoms, it is sufficient to heat the hydroxy acid in an open reaction vessel.

The novel alpha,beta-ethylenically unsaturated phosphonic acid dichlorides of this invention may be employed in the preparation of useful organic compounds of phosphorus as follows:

(a) The dichlorides may be converted to alpha, beta-ethylenically unsaturated aliphatic hydrocarbon phosphonic acids by carefully adding the dichloride to water in a reaction vessel, preferably equipped with a mechanical agitator. The resulting solution is evaporated to dryness, the corresponding alkenephosphonic acid being obtained in a high state of purity.

(b) A solution containing two moles of an alkali alcoholate dissolved in an excess of the corresponding alcohol is placed in a reactor equipped with a reflux condenser, a sealed mechanical stirrer, and a suitable addition device. One mole of the dichloride is added slowly, with cooling and agitation, to the solution. When the addition is complete, the mixture is heated to the point of reflux to complete the reaction, the salt is removed by filtration, and the filtrate is fractionally distilled to obtain in pure state the corresponding phosphonic acid diester.

(c) A excess of an amine over the molecular requirement is placed in a reactor equipped with a suitable addition device, a sealed mechanical stirrer, and a reflux condenser. The reactor is surrounded by a cooling bath and the phosphonic acid dichloride is added to the amine slowly and with agitation. The reaction is essentially over when the addition is complete. After the excess amine is removed by distillation, the mixture is diluted with ether and filtered to remove amine hydrochloride. The filtrate is freed from ether by distillation and the residue is distilled to obtain the pure alkenephosphon-diamide.

The practice of this invention is illustrated by the following examples, in which the parts are given by weight unless otherwise specified.

EXAMPLE I

The dehydration is conducted in a vertically-mounted electric furnace having a one-inch tube packed with 50 cc. of fused silica. Molten 2-hydroxy-2-propanephosphonic acid is run through the furnace at a temperature of 190–220° C. and a rate of one hundred and forty grams per hour. The product is a syrup which is dried by heating at 110° C. and a pressure of 15 mm. The yield of dried product is 78.5 per 100 parts of phosphonic acid employed.

To ten parts of the dried product there is added 42 parts of phosphorus pentachloride, portionwise, and with cooling during the early stages of the addition. When the reaction is complete, as evidenced by no further evolution of gas, the mixture is distilled under reduced pressure in a still having an L-shaped tubulated column. Seven and six-tenths parts of 1-propene-2-phosphonic dichloride, B. P. 82.5–86° C./32 mm., is obtained.

*Anaylsis*

|  | Calculated for C₃H₄OPCl₃ | Found |
|---|---|---|
| Molecular weight | 159 | 156.7 |
| Total Cl | 45.65 | 45.50 |
| Hydrolyzable Cl | 45.65 | 44.66 |
| C | 22.62 | 22.02 |
| H | 3.14 | 3.09 |
| P | 19.43 | 19.66 |
| Bromine number | 99.3 | 95.6 |

EXAMPLE II 1-propene-2-phosphonic acid may be obtained in crude form (62.2% purity as evidenced by bromine titration) by dehydrating the 2-hydroxy-2-propanephosphonic acid by passing steam super-heated to 190° C. through the same.

Six hundred and twenty parts of the above crude 1-propene-2-phosphonic acid was heated with 2460 parts of thionyl chloride at 70° C. for 18 hours. On distillation at 85–93° C. at 40 mm. pressure 233 parts of 1-propene-2-phosphonic acid dichloride was obtained corresponding to 45% of the theoretical yield.

On heating 631 parts of the same crude 1-propene-2-phosphonic acid with 2882 parts of phosphorus pentachloride, a yield of 287 parts, distilling at 83° C. at 30 mm. or 55% of that theoretically possible, of 1-propene-2-phosphonic acid dichloride was obtained.

EXAMPLE III

Five hundred and eighty-eight parts of 18-hydroxy-18-pentatriacontanephosphonic acid is dehydrated by heating at 130–140° C. for 3 hours. The 17-pentatriacontene-18-phosphonic acid so formed (570 parts) is an oily semi-solid at 25° C. but fluid at 35–40° C.

*Analysis*

|  | Calculated for C₃₅H₇₁O₃P | Found |
|---|---|---|
| Bromine number | 27.7 | 21.34 |
| Acid number | 196.4 | 200.4 |
| P | 5.44 | 5.95 |

The alpha,beta-unsaturated aliphatic hydrocarbon phosphonic acid dichlorides or alkenephosphonic acid dichlorides of this invention may be converted to the acids, diesters or diamides by reaction with active hydrogen compounds having hydrogen on polyvalent negative inorganic elements, i. e., water, alcohol, phenols, N-hydrogen amines, as illustrated in the following examples.

EXAMPLE IV

One hundred and fifty-nine parts of 1-propene-2-phosphonic acid dichloride is dropped slowly into 150 parts of water, the reaction vessel being cooled externally during the addition. When the reaction is complete, as evidenced by the homogeneous nature of the solution, the solution is boiled with discolorizing carbon, filtered, and evaporated to dryness. Crystallization is induced by cooling or seeding. The 1-propene-2-phosphonic acid is obtained in essentially quantitative yield (122 parts) as a white, crystalline, slightly hygroscopic mass.

*Analysis*

|  | Calculated for C₃H₇O₃P | Found |
|---|---|---|
| C | 29.5 | 28.27 |
| H | 5.74 | 6.21 |

EXAMPLE V

One hundred and fifty-four parts of metallic sodium is dissolved in 1385 parts of methyl alcohol in a reactor equipped with reflux condenser, sealed mechanical stirrer and addition device. The reactor is cooled to 0° C. while 512 parts of 1-propene-2-phosphonic acid dichloride is added slowly with agitation to the alcohol solution. When the addition is complete, the mixture is heated to the point of reflux for one hour, neutralized by passing in dry hydrogen chloride gas, and filtered to remove the salt. The major portion of the methanol is removed by distillation, the mixture is filtered again to remove precipitated salt, and the filtrate is distilled under reduced pressure. Four hundred and twenty parts of dimethyl 1-propene-2-phosphonate, boiling at 44–46° C. at 1–2 mm. pressure, is obtained. The ester has a refractive index at 20° C. of 1.4340.

*Analysis*

|  | Calculated for C₅H₁₁O₃P | Found |
|---|---|---|
| Molecular weight | 150 | 151 |
| C | 40.00 | 39.26 |
| H | 7.33 | 7.43 |
| P | 21.3 | 20.23 |
| Bromine number | 105.3 | 101.3 |

EXAMPLE VI

In an apparatus similar to that described in Example V, three hundred and eighteen parts of 1-propene-2-phosphonic acid dichloride is slowly added to 94 parts of metallic sodium dissolved in 1375 parts of n-butanol. The mass is allowed to stand for several hours and then about one-half of the butanol is distilled out. The sodium chloride formed is filtered from the liquid and the filtrate is dried over sodium sulfate, filtered, and fractionally distilled. Three hundred parts of dibutyl 1-propene-2-phosphonate is collected at 86–87° C. at a pressure of 0.25 mm. The refractive index at 20° C. of the product is 1.4376.

*Analysis*

|  | Calculated for C₁₁H₂₃O₃P | Found |
|---|---|---|
| C | 56.5 | 57.02 |
| H | 9.83 | 10.18 |
| P | 13.25 | 12.93 |
| Molecular weight | 234 | 226 |

EXAMPLE VII

Four hundred and fifty-four parts of phenol and 318 parts of 1-propene-2-phosphonic acid dichloride are heated together for 24 hours, the temperature being gradually raised from 60–80°

C. to a final temperature of 190° C. The slight amount of unreacted phenol is topped from the reaction vessel at a pot temperature of 160-180° C. at 0.4 mm. Five hundred and fifty parts of diphenyl 1-propene-2-phosphonate is obtained.

Analysis

|  | Calculated for C₁₅H₁₅O₃P | Found |
|---|---|---|
| C | 65.3 | 62.49 |
| H | 5.48 | 5.11 |
| P | 11.3 | 11.15 |
| Molecular weight | 274 | 286 |

Example VIII

Three hundred and eighteen parts of 1-propene-2-phosphonic acid dichloride is added slowly with agitation and at a temperature below −10° C., i. e., at the temperature of a dry ice-acetone bath (−40–50° C. during most of addition) to 975 parts of dimethylamine. The mass is warmed gently to remove excess amine, diluted with 354 parts of ether, and filtered to remove dimethylamine hydrochloride. Two hundred and thirty-two parts of N,N,N',N'-tetramethyl-1-propene-2-phosphondiamide is collected at 76–80° C. at a pressure of 2–3 mm. The refractive index at 20° C. of this product is 1.4735.

Analysis

|  | Calculated for C₇H₁₇N₂OP | Found |
|---|---|---|
| C | 47.7 | 46.71 |
| H | 9.66 | 9.85 |
| N | 15.9 | 16.60 |
| P | 17.6 | 17.36 |
| Bromine number | 89.8 | 82.49 |
| Molecular weight | 176 | 186 |

The dehydration may be effected with the aid of acetic anhydride, anhydrides of volatile aliphatic carboxylic acids in general, or with ketene. Example IX below illustrates the use of acetic anhydride.

Example IX

A mixture of 130 parts of 2-hydroxy-2-propane-phosphonic acid and 408 parts of acetic anhydride is heated at a temperature ranging between 125° C. and 150° C. in a reaction vessel attached to a fractionating column to distill out acetic acid as it is formed. After about 150 parts of distillate have been collected, a short column is substituted and the rest of the acetic anhydride and acetic acid removed under reduced pressure. The residue is treated with 250 parts of thionyl chloride and distilled to obtain 78.5 parts of 1-propene-2-phosphonic acid dichloride.

In a similar experiment employing 80 parts of 2-hydroxy-2-propanephosphonic acid and 230 parts of acetic anhydride, the residue is treated with 208 parts of phosphorus pentachloride and distilled to obtain 23 parts of 1-propene-2-phosphonic acid dichloride.

Example X

This example illustrates the simultaneous dehydration to the olefine and conversion to the phosphonic acid dichloride.

A mixture of 50 parts of 2-hydroxy-2-propanephosphonic acid and 224 parts of phosphorus pentachloride is heated for two hours and then distilled under reduced pressure to obtain 15 parts of 1-propene-2-phosphonic acid dichloride.

This invention is generic to the dehydration, by heating at 125–250° C., of aliphatic hydroxy phosphonic acids having an hydroxyl group and a phosphono group on the same carbon and on the next carbon at least one hydrogen, the remainder of the molecule being saturated acyclic aliphatic hydrocarbon, and to the preparation of the corresponding alpha,beta-ethylenically unsaturated phosphonic acids, dichlorides, diesters and diamides. In addition to the hydroxy acids exemplified above, there may be used 2-hydroxy-2-butanephosphonic, 3-hydroxy-3-pentanephosphonic, 2 - methyl - 3 - hydroxy - 3 - butanephosphonic, 2 - methyl - 3 - hydroxy - 3 - pentanephosphonic, 2-hydroxy-2-pentanephosphonic, 2-hydroxy - 2 - hexanephosphonic, 2-hydroxy-2-octanephosphonic, 2-methyl-4-hydroxy-4-pentane-phosphonic, 2,6-dimethyl-4-hydroxy-4-heptane-phosphonic, 6-hydroxy-6-undecanephosphonic, 5-hydroxy - 5 - nonanephosphonic, 2,7-dimethyl-4-hydroxy-4-octanephosphonic, 10 - ethyl - 7 - hydroxy-7-tetradecanephosphonic, 2-methyl-5-hydroxy - 5 - hexadecanephosphonic, 5-ethyl-8-hydroxy-8-tetradecanephosphonic, 7-methyl-9-hydroxy-9-pentadecanephosphonic, 2-methyl-4-hydroxy - 4 - heptadecanephosphonic, 2-methyl-4-hydroxy-4-dodecanephosphonic, 2,8,12-trimethyl-4-hydroxy-4-tridecanephosphonic, 2-methyl-8 - ethyl - 5 - hydroxy - 5 - dodecanephosphonic, 5-ethyl-8-hydroxy-8-hexadecanephosphonic, 3-ethyl-6-hydroxy-6-tetradecanephosphonic, 3,9-diethyl - 6 - hydroxy - 6 - tridecanephosphonic, 6 - propyl - 8 - ethyl - 5 - hydroxy - 5 - dodecane-phosphonic, 9-ethyl-5-methyl-6-hydroxy-6-tridecanephosphonic, 8 - hydroxy - 8 - pentadecane-phosphonic, 7 - hydroxy - 7 - pentadecanephosphonic, 6 - hydroxy - 6 - pentadecanephosphonic, 5 - hydroxy - 5 - pentadecanephosphonic, 4 - hydroxy - 4 - pentadecanephosphonic, 3-hydroxy-3-pentadecanephosphonic, 2-hydroxy-2-pentadec-anephosphonic, 4-propyl-6-hydroxy-6-dodecanephosphonic, 5-butyl-4-hydroxy-4-undecanephosphonic, 6-amyl-7-hydroxy-7-decanephosphonic, 5-ethyl-2-hydroxy-2-nonanephosphonic, 3-ethyl-4 - hydroxy - 4 - pentadecanephosphonic, 10-hydroxy - 10 - nonadecanephosphonic, 2,6,10,14-tetramethyl - 8 - hydroxy - 8 - pentadecanephosphonic, 15 - hydroxy - 15 - nonacosanephosphonic, 12-hydroxy-12-tricosanephosphonic, and 5,11 - diethyl - 8 - hydroxy - 8 - pentadecane-phosphonic acids. These yield the corresponding dichloride when treated with phosphorus pentachloride as in Example I, or with thionyl chloride as on Example II.

Hydroxyalkanephosphonic acids having the hydroxyl, the phosphono, and but one alkyl group on the same carbon may be dehydrated but the process is attended with such difficulty that those having two alkyls on the hydroxy and phosphone carbon are preferred. For similar reasons acyclic aliphatic compounds are preferred to alicyclic compounds, such as 1-hydroxy-1-cyclohexane-phosphonic acid.

The initial materials of the first phase of the invention, namely, the alpha-hydroxy phosphonic acids may be obtained by reacting a ketone with a tervalent phosphorus halide and subsequently hydrolyzing the phosphonic halide formed (U. S. Patent 2,254,124, Conant et al., J. Am. Chem. Soc. 43, 1928 (1921)). In those cases in which the hydroxy acid is derived from an unsymmetrical ketone, a mixture of isomeric products is obtained by dehydration.

The temperature range required for dehydration varies with the starting material. The upper limit is that at which decomposition, above and beyond dehydration, takes place to such an extent that the yield of the dehydration product is adversely affected. In many cases, appreciable dehydration will take place at temperatures considerably below the preferred limit, but the rate will be much slower and the yields low.

The method of heating may also vary widely since dehydration may be accomplished by heating in an open vessel, heating under reduced pressure or heating in solution. When a furnace is employed, as in Example I, the fused silica may be replaced by silica gel, glass rings, or substantially inert material of a particle size which presents adequate surface for reaction but does not unduly inhibit the flow of the molten acid.

The dehydration may also be effected by employing other agents such as acetic anhydride, thionyl chloride, phosphorus pentabromide, or phosphorus pentachloride. A useful feature of the latter three agents is that dehydration and conversion to the alkenephosphonic acid dichloride (or dibromide) are accomplished simultaneously. Inorganic acid halides of oxy acids of the fifth and sixth groups of the second full period are preferred.

It is not necessary to isolate the products of each step before proceeding to the next one. For example, the initial dehydration product, the alpha,beta-unsaturated phosphonic acid, may be converted to the acid dichloride by reaction with phosphorus pentachloride; the phosphorus oxychloride which is formed may be removed by distillation, and the residue, without further purification, may be treated with the alkali alcoholate or amine to obtain the ester or amide, respectively.

Of the new compounds of this invention the alpha, beta-unsaturated phosphonic acid dichlorides and dibromides of the formula

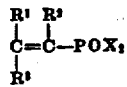

wherein X is a halogen of atomic weight between 20 and 80, $R^1$ and $R^3$ are hydrogen or alkyl radicals and $R^2$ is an alkyl radical, are useful intermediates in the preparation of a variety of esters and amides by reaction with metal alcoholates and amines, respectively. They are generally high-boiling liquids which react vigorously with compounds having active hydrogen atoms, e. g., water, alcohols, amines, etc.

The new alpha,beta-unsaturated phosphondiamides of this invention have the formula

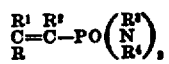

wherein $R^2$ is an alkyl radical and R and $R^1$, $R^3$ and $R^4$ are hydrogen or alkyl radicals and may be used as plasticizers and softening agents and for imparting improved properties to lubricating oils.

The diesters have the formula

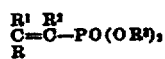

wherein $R^2$ is an alkyl radical, R and $R^1$ hydrogen or alkyl radicals and $R^3$ an alkyl or aryl radical. They may be used as intermediates for further chemical synthesis, e. g., amide formation, as plasticizers, flame-retardants, and petroleum adjuvants.

The diesters and diamides may be obtained from the acid chlorides as disclosed in Examples V, VI, VII, and VIII. In place of the alcohols of Examples V and VI there may be employed any alcohol including monohydric and polyhydric aliphatic alcohols, cycloaliphatic alcohols, ether alcohols, and araliphatic alcohols, including ethanol, stearyl alcohol, ethylene glycol, cyclohexanol, methoxyethanol, and benzyl alcohol.

In place of the phenol of Example VIII there may be employed any phenol including polyhydric phenols and polynuclear phenols, including cresol, resorcinol, hydroquinone, and beta-naphthol.

There may be employed instead of the amine of Example VIII ammonia or any amine containing at least one hydrogen atom attached to nitrogen including aliphatic amines and diamines, alicyclic amines, aromatic amines, and araliphatic amines, including diethylamine, methylamine, dodecylamine, hexamethylenediamine, cyclohexylamine, aniline, and benzylamine. Thus, there may be prepared the following amides:

N,N,N',N'- tetraethyl- 1 -propene-2-phosphondiamide
1-propene-2-phosphondiamide
N,N'-dimethyl-1-propene-2-phosphondiamide
N,N,N',N'-tetramethyl-2-pentene - 3 - phosphondiamide
N,N,N',N'- tetramethyl-7-pentadecene - 8 - phosphondiamide
N,N,N',N'- tetrabenzyl-1-propene-2-phosphondiamide
N,N'-dimethyl-N,N'-diphenyl-2-pentene-3-phosphondiamide
17-pentatriacontene-18-phosphondiamide
N,N'- didodecyl-2,6-dimethyl-3-heptene-4-phos - phondiamide
N,N'-dicyclohexyl-2-pentene-3-phosphondiamide
9-nonadecene-10-phosphondianilide In place of the particular alpha,beta-ethylenically unsaturated phosphondichloride of Examples V and VII, there may be employed any of the alpha,beta-ethylenically unsaturated aliphatic phosphondichlorides of this invention including:

2-pentene-3-phosphonic dichloride
2,6-dimethyl-3-heptene-4-phosphonic dichloride
4-nonene-5-phosphonic dichloride
5-undecene-6-phosphonic dichloride
2-methyl-2-butene-3-phosphonic dichloride
7-pentadecene-8-phosphonic dichloride
5,11-diethyl-7-pentadecene - 8 - phosphonic dichloride
2,6,10,14-tetramethyl - 7 - pentadecene - 8 - phosphonic dichloride
9-nonadecene-10-phosphonic dichloride
11-tricosene-12-phosphonic dichloride
17-pentatriacontene-18-phosphonic dichloride Certain of the products, e. g., the esters and amides are generally useful for imparting improved properties to lubricating oils. They also have value as plasticizers. The long chain acids and their salts foam readily in solution and display detergent action. The acids also have value as flame-proofing agents. A preferred embodiment is the process for preparing 1-propene-2-phosphonic acid, $$CH_2=C-PO_3H_2$$
$$|$$
$$CH_3$$

by heating 2-hydroxy-2-propanephosphonic acid at a temperature of 175°–250° C. Another preferred embodiment is a process for preparing 17- pentatriacontene-18-phosphonic acid by heating 18-hydroxy-18-pentatriacontane-phosphonic acid at a temperature of 130°–140° C.

The above description and examples are intended to be illustrative only. Any modification of or variation therefrom which conforms to the spirit of the invention is intended to be included within the scope of the claims.

What is claimed is:
1. Propene-2-phosphonic acid dichloride.
2. An alpha,beta - unsaturated alkenephosphonic acid dichloride.

LYLE A. HAMILTON.

CERTIFICATE OF CORRECTION.

Patent No. 2,365,466. December 19, 1944.

LYLE ARMSTRONG HAMILTON.

It is hereby certified that error appears in the printed specification of the above numbered patent requiring correction as follows: Page 2, first column, line 75, Example IV, for "discolorizing" read --decolorizing--; page 4, second column, line 43, for "VII" read --VIII--; and that the said Letters Patent should be read with this correction therein that the same may conform to the record of the case in the Patent Office.

Signed and sealed this 20th day day of March, A. D. 1945.

Leslie Frazer (Seal)

Acting Commissioner of Patents.

pentatriacontene-18-phosphonic acid by heating 18-hydroxy-18-pentatriacontane-phosphonic acid at a temperature of 130°–140° C.

The above description and examples are intended to be illustrative only. Any modification of or variation therefrom which conforms to the spirit of the invention is intended to be included within the scope of the claims.

What is claimed is:
1. Propene-2-phosphonic acid dichloride.
2. An alpha,beta - unsaturated alkenephosphonic acid dichloride.

LYLE A. HAMILTON.

CERTIFICATE OF CORRECTION.

Patent No. 2,365,466. December 19, 1944.

LYLE ARMSTRONG HAMILTON.

It is hereby certified that error appears in the printed specification of the above numbered patent requiring correction as follows: Page 2, first column, line 75, Example IV, for "discolorizing" read --decolorizing--; page 4, second column, line 43, for "VII" read --VIII--; and that the said Letters Patent should be read with this correction therein that the same may conform to the record of the case in the Patent Office.

Signed and sealed this 20th day day of March, A. D. 1945.

Leslie Frazer (Seal)

Acting Commissioner of Patents.